United States Patent [19]
DeCrescente et al.

[11] 4,064,207
[45] Dec. 20, 1977

[54] FIBRILLAR CARBON FUEL CELL ELECTRODE SUBSTRATES AND METHOD OF MANUFACTURE

[75] Inventors: Michael A. DeCrescente, Wethersfield; George K. Layden, East Hartford; Roscoe A. Pike, Simsbury, all of Conn.

[73] Assignee: United Technologies Corporation, Hartford, Conn.

[21] Appl. No.: 654,226

[22] Filed: Feb. 2, 1976

[51] Int. Cl.² .............................. D01F 9/22
[52] U.S. Cl. .................... 264/29.6; 162/157 R; 264/91; 264/137; 264/140; 423/447.6; 423/447.7; 427/228; 428/280
[58] Field of Search ............. 264/29.1, 29.4, 29.5, 264/29.6, 91, 29.7, 137, 140; 423/447.6, 447.7; 162/138, 157 R; 136/120 FC; 428/280; 427/1.5, 228; 254/425.3

[56] References Cited
U.S. PATENT DOCUMENTS

| | | | |
|---|---|---|---|
| 3,265,557 | 8/1966 | DeFries et al. | 162/138 |
| 3,367,812 | 2/1968 | Watts | 264/29.5 |
| 3,573,086 | 3/1971 | Lambdin | 264/29.1 |
| 3,681,023 | 8/1972 | Tabata et al. | 423/447.6 |
| 3,682,595 | 8/1972 | Okuda et al. | 264/29.3 |
| 3,728,423 | 4/1973 | Shaffer | 264/29.5 |
| 3,790,393 | 2/1974 | Cowland et al. | 264/29.5 |
| 3,829,327 | 8/1974 | Omori et al. | 136/120 FC |
| 3,961,888 | 6/1976 | Riggs | 423/447.6 |

*Primary Examiner*—Jeffery R. Thurlow

[57] ABSTRACT

Porous carbon sheets suitable for use as fuel cell electrode support plates are produced from inexpensive carbonizable filaments. The filaments are chopped into short lengths, felted, sprayed with a binder and the binder is cured whereby sheets are defined. The sheets are thereafter pyrolyzed to convert both the binder and filaments to carbon and to thereby produce the desired porous substrate material.

7 Claims, 1 Drawing Figure

20μ

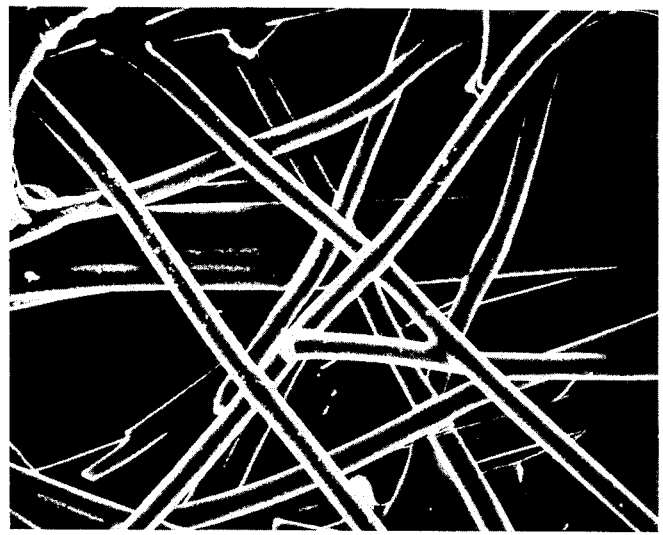
20µ

FIBRILLAR CARBON FUEL CELL ELECTRODE SUBSTRATES AND METHOD OF MANUFACTURE

BACKGROUND OF THE INVENTION

1. Field of the Invention

The present invention relates to the production of porous carbon structures and particularly to the manufacture of resin bonded fibrillar carbon paper. More specifically, this invention is directed to fibrillar carbon fuel cell electrode substrates. Accordingly, the general objects of the present invention are to provide novel and improved methods and articles of such character.

2. Description of the Prior Art

While not limited thereto in its utility, the present invention is particularly well suited to the production of carbon or graphite "paper". Such carbon "paper" has been employed as electrode support plates and could be substituted for the present porous sintered nickle electrolyte reservoir plates in fuel cells. For a fuel cell application, carbon "paper" must, in addition to being cost effective, meet rather stringent chemical, physical and electrical property requirements. Thus, by way of example, material for use in a fuel cell as an electrode support plate must be characterized by a high degree of resistance to oxidation, availability in a thickness range of 15 to 30 mils while retaining sufficient strength to permit handling and have a porosity in the range of 70 to 90%. This high degree of porosity must be obtained, in the case of a fuel cell electrode support plate, with pore size in the range of 15 to 30μ. Additionally, the material must be characterized by a lateral resistivity in the range of 0.01 to 0.09 ohm-cm with the preferred resistivity range being 0.01 to 0.06 ohm-cm.

As an example of the utilization of porous carbon "paper" having the above outlined characteristics, in acid electrolyte fuel cells such "paper" presently functions as support plates to hold the active catalyst of the fuel cell. Carbon "paper" may also be employed as fuel cell electrolyte reservoir plates. An electrolyte reservoir plate in a fuel cell will contain excess KOH solution within its pores, the pores in the case of an electrolyte reservoir plate having an average size in the range of 3-8μ, and will serve to assure that the maximum amount of the electrolyte communicates with the cell. The electrolyte reservoir plate is also the media through which the product water produced in the fuel cell is removed. In addition to being lightweight, having high pore volume and KOH compatibility, the electrolyte reservoir plate material must be easily wet and contain a narrow pore size distribution to facilitate delivery of electrolyte from its structure to the cell matrix on demand.

The conventional prior art manner of forming porous carbon structures suitable for use as fuel cell catalyst support plates consists of forming chopped carbon fibers into paper-like structures and subsequently bonding the fibers together by chemical vapor deposition of a carbon binder phase. Alternatively, porous carbon "paper" may be fabricated by bonding chopped carbon fibers together with a polymer resin which is subsequently pyrolyzed to form a carbon binder. These prior art techniques are inherently slow and costly. A primary contributing factor to the high cost of the prior art techniques resides in the use of expensive graphite or carbon fibers as the starting material. The use of graphite or carbon fibers as the starting material dictates that the production of the porous carbon "paper" included two graphitization steps; i.e., graphitization to produce the starting fiber and then performance of a further pyrolyzation step to convert the binder material to carbon.

SUMMARY OF THE INVENTION

The present invention overcomes the above briefly discussed disadvantages of the prior art by providing a novel and improved technique for the production of rigid porous felted carbon structures and by providing comparatively inexpensive carbon "paper", suitable for use as fuel cell catalyst support and reservoir plates, through the practice of such novel technique.

In accordance with the present invention filaments consisting of an inexpensive material which can be pyrolyzed to form carbon fibers are selected. The carbonizable filaments are reduced to fibers of short length and the chopped fibers are "felted"; i.e., the randomly oriented fibers are caused to be uniformly distributed on a planar support. A resin binder is thereafter applied typically by spraying while applying suction to the "felted" fibers, and the coated felt is cured. The weight of the cured resin is controlled so as to be in the range of 12 to 25% of the resulting felt and preferably in the range of 17 to 20% of the felt. Thereafter, the felt is subjected to pyrolysis by heating in a non-oxidizing atmosphere to produce the desired porous end product.

If acrylic filaments are selected for use in practice of the invention, these filaments may be subjected to an oxidation treatment which alters the polymer chemistry of the filaments prior to chopping and felting; the filaments being stabilized and rendered non-melting. The oxidation treatment for acrylic filaments is controlled in such a manner that the oxidized filaments contain 3 to 15% by weight of oxygen.

BRIEF DESCRIPTION OF THE DRAWING

Understanding of the present invention will be facilitated by reference to the accompanying drawing which is a scanning electron micrograph of a carbon felt produced in accordance with the present invention magnified 500 times.

DESCRIPTION OF THE PREFERRED EMBODIMENT

In accordance with the present invention fibrillar carbon "paper" having a porosity in the range of 70-90% is prepared employing a filament precursor; the precursor being comprised of any inexpensive material available in filament form which can be pyrolyzed to form a carbon fiber. The filament may be comprised of acrylonitrile polymers including homopolymers, copolymers, terpolymers, graph polymers and the like containing at least 50% acrylonitrile and preferably at least 80% acrylonitrile. Alternatively, the filament may be comprised of a naturally occurring celluslosic fiber such as rayon. The diameter of the filament employed is in part determinative of the pore size of the end product and in order to obtain porosity in the preferred range of 80-85% with a pore size in the range of 15-30μ the initial filament diameters should be in the range of 12-15μ.

If an acrylic filament is employed, the first step in the practice of the invention consists of stabilizing a yarn comprised of a plurality of filaments by subjecting the yarn to an oxidation treatment which alters the polymer chemistry so as to render the constituent filaments non-melting. This oxidation treatment will typically comprise passing the yarn through a forced draft muffle which is maintained at a temperature of approximately 215° C. The passage of the yarn through the muffle is regulated so that the yarn has a total residence time at temperature commensurate with the amount by weight of oxygen it is desired to introduce into the polymer. The usable range of oxygen content for an acrylic filament is 3 to 15%. Maintaining an acrylic yarn at the processing temperature of 215° C for a time of 4 hours will, for example, introduce 9 to 10% by weight oxygen into the polymer. Shorter resident times give lower oxygen content.

The cellulosic or stabilized acrylic filament is mechanically "chopped" into fibers having the desired length. The chopping step may, for example, be performed in a cutting mill having openings commensurate with the desired porosity of the end product. Restated, the porosity of the end product is also in part controlled by the average length of the individual fibers. Good results have been obtained, with an end product having porosity in the preferred range of 80 to 85% and filaments having a diameter in the range of 12 to 15μ, by reduction of the filaments to lengths in the range of 0.635 to 0.32 centimeters.

The chopped fibers are "felted" by any one of several known techniques including merely manually or mechanically uniformly distributing the fibers on a planar surface. For commercial production, however, the felt will customarily be prepared using a water slurry of the chopped fiber. When using a water slurry the chopped fiber may be ultrasonically dispersed in the water. The fiber is allowed to settle onto a removable screen at the bottom of the container after dispersion, the screen is withdrawn and the wet felt dried in an air oven. Alternatively, and preferably, the water slurry of fiber may be subjected to suction filtration with the felt forming on a filter paper. The felt formed on the filter paper will be dried in an air oven as discussed above. It may, in some cases, be desirable to add a wetting agent to the water to facilitate the felting step.

The dried felt, produced as described above, is next impregnated with a resin. The preferable method of applying the resin has been found to be by spray application while applying suction to the felt. Uniform distribution and strongly bonded material will result when the weight of the cured resin is 12 to 25% of that of the resulting felt. A weight percent of cured resin in the range of 18 to 19% has been found to produce particularly good results. Either a furfural-maleic anhydride prepolymerized copolymer or commercially available Monsanto Chemical Company SC-1008 phenolic resin in an isopropyl alcohol solution have been successfully employed as the resin binder. A particularly good spray application comprised 12cc of a 2/1 isopropyl alcohol/SC-1008 solution per 1.0 gram of felt.

The felt is subjected to a curing step after application of the binder. Again considering the example where the binder consists of the phenolic resin in an isopropyl alcohol solution, curing is accomplished in an air oven at 160° C with a resident time of ½ to ¾ hours being typical.

Subsequent to curing of the resin, the final fabrication step, which comprises the carbonization of the felt, is performed. In accordance with this final step the felt is pyrolyzed by heating in an argon atmosphere to a temperature in the range of 1000° C to 1250° C at a rate of 100° C per hour. To insure uniform heating the samples being pyrolyzed will typically be placed between smooth graphite discs, the discs having surfaces which permit shrinkage without cracking of the end product, and embedded in a carbon powder pack. The samples undergo shrinkage during the phyrolyzation step and this fact must, of course, be taken into account in the design of the production equipment. The average lateral shrinkage when firing to 1000 ° C has been found to be in the range of 10 to 12% with the average lateral shrinking being in the range of 13 to 14% at 1260° C.

In one reduction to practice of the invention, 14μ diameter acrylic filaments, similar in composition to the product sold commercially under the trademark Acrylan, were obtained from the Monsanto Chemical Company. These filaments were stabilized in a continuous process by passage through a forced draft muffle maintained at a temperature of 215° C. The passage of a yarn comprising the acrylic filaments through the muffle was regulated so that the filaments had a total residence time at temperature of 4 hours. This stabilization treatment introduced approximately 9.2 % by weight oxygen into the polymer. The stabilized yarn was then cut into short lengths. A cutting mill having 2 mil openings has been employed to produce the shredded or chopped fiber. The chopped fibers were felted, employing the suction technique briefly described above, and the resulting dry felt was impregnated with a phenolic resin binder. The resin was applied by spraying of 12cc of a 2/1 isopropyl alcohol/Monsanto SC-1008 phenolic resin solution per 1.0g of felt while applying suction to the felt. The weight of the cured resin, applied by this technique, was 18-19% of the resulting felt. The phenolic resin coated felt was thereafter cured at 160° C for ¼ hour. The production of the carbon "paper" was completed by heating the felt to 1230° C in an argon atmosphere at a rate of 100° C per hour. The resulting samples, which were 28 mils in thickness, experienced a shrinkage of 13.7% during the pyrolyzation step.

Physical and mechanical properties of porous carbon "paper" produced in accordance with the present invention can be controlled over wide ranges by varying the process parameters. Thus, the porosity, bulk density and specific gravity have been found to be controlled primarily by the felt making process and particularly by the diameter and aspect ratio of the fibers and volume content of the binder. The resistivity is controlled by the firing temperature and by the volume content of the resin.

In a fuel cell electrolyte support plate application, the water expulsion characteristics determine the effectiveness of a porous plate to desorb and absorb electrolyte on demand. The water expulsion characteristics, in percent of water expelled, vary with the operating pressure and, with a felted fibrillar carbon paper produced in accordance with the present invention, the percent of water expulsion closely corresponds to that of currently used sintered nickle plates.

The resistivity of the resin bonded porous carbon "paper" of the present invention must also be controlled for the material to be suitable for fuel cell applications. As noted above, the resistivity of the "paper" is controlled by the degree of carbonization which occurs during the pyrolysis step with the resistivity decreasing with higher temperatures. For material pyrolyzed at 1000° C, the resistivity varies directly with the percent of open porosity with a maximum resistivity of 0.056 ohm-cm corresponding to a porosity of 86.8% while a resistivity of 0.038 ohm-cm corresponds to a porosity of 58.6%. With a sample pyrolyzed at 1260° C, a resistivity of 0.048 ohm-cm corresponds to the 86.8% open porosity. It is necessary that the pyrolyzation be controlled to produce, in a "paper" having a thickness in the range of 15-20 mils, a lateral resistivity in the range of 0.01 to 0.06 ohm-cm.

While a preferred embodiment has been shown and described, various modifications and substitutions may be made thereto without departing from the spirit and scope of the invention. Accordingly, it is to be understood that the present invention has been described by way illustration and not limitation.

What is claimed is:

1. A process for the manufacture of carbon substrate material having a fibrillar microstructure and a porosity in the range of 70-90% comprising the steps of:

selecting an acrylic polymer filament having a diameter commensurate with the desired porosity of the substrate material, said filament containing at least 50% acrylonitrile;

stabilizing a plurality of the selected acrylic polymer filaments by heating the filaments in an oxidizing atmosphere until between 3% and 15% by weight oxygen is introduced into the polymer;

reducing the stabilized filaments to fibers having a preselected average length;

felting the fibers of preselected average length to produce a layer of uniform thickness with random fiber orientation;

impregnating the felted fibers with a resinous binder to define a sheet material, the binder comprising 12-25% by weight of the sheet material;

subjecting the sheet material including the stabilized acrylic polymer fibers to an elevated temperature to cure the resinous binder; and subjecting the sheet material to a temperature in the range of 1000° C to 1260° C in a non-oxidizing atmosphere subsequent to curing the binder to pyrolyze the fibers and binder and thereby produce a porous carbon substrate material.

2. The method of claim 1 wherein the step of reducing the selected filament to fibers comprises:

mechanically severing the filamentary material so as to produce fibers having an aspect ratio commensurate with the desired porosity.

3. The method of claim 1 wherein the step of felting comprises:

forming an aqueous slurry of the fibers; and
    depositing the fibers from the slurry on a substrate to define a felt; and
    drying the felt.

4. The method of claim 1 wherein the step of impregnating the felted fiber with a resinous binder comprises:

spraying the felted fibers with a resin while applying suction to the felted fibers.

5. The method of claim 2 wherein the step of impregnating the felted fiber with a resinous binder comprises:

spraying the felted fibers with a resin while applying suction to the felted fibers.

6. The method of claim 3 wherein the step of reducing the selected filament to fibers comprises:

mechanically severing the filamentary material so as to produce fibers having an aspect ratio commensurate with the desired porosity.

7. The method of claim 5 wherein the step of felting comprises:

forming an aqueous slurry of the fibers; and
    depositing the fibers from the slurry on a substrate to define a felt; and
    drying the felt.

* * * * *